(12) United States Patent
Liu

(10) Patent No.: US 10,789,148 B2
(45) Date of Patent: Sep. 29, 2020

(54) ELECTRONIC DEVICE AND METHOD FOR EVENT LOGGING

(71) Applicant: Wistron Corporation, New Taipei (TW)

(72) Inventor: Kuan-Lin Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 220 days.

(21) Appl. No.: 16/020,988

(22) Filed: Jun. 27, 2018

(65) Prior Publication Data

US 2019/0317875 A1 Oct. 17, 2019

(30) Foreign Application Priority Data

Apr. 16, 2018 (TW) .............................. 107112936 A

(51) Int. Cl.
*G06F 11/34* (2006.01)
*G06F 11/07* (2006.01)
*G06F 9/54* (2006.01)
*G06F 1/08* (2006.01)
*G06F 13/42* (2006.01)

(52) U.S. Cl.
CPC ............ *G06F 11/3476* (2013.01); *G06F 1/08* (2013.01); *G06F 9/542* (2013.01); *G06F 11/079* (2013.01); *G06F 13/4282* (2013.01); *G06F 2201/835* (2013.01); *G06F 2201/86* (2013.01)

(58) Field of Classification Search
CPC ...... G06F 1/14; G06F 2201/835; G06F 9/542; G06F 13/4282; G06F 11/079; G06F 2201/86; G06F 11/3476; G06F 1/08
See application file for complete search history.

(56) References Cited

U.S. PATENT DOCUMENTS

| 5,682,328 | A | * | 10/1997 | Roeber | ............... G06F 11/3476 702/187 |
| 6,269,412 | B1 | * | 7/2001 | Liu | ........................... G06F 1/20 710/19 |
| 2009/0077426 | A1 | * | 3/2009 | Liberty | ..................... G06F 1/24 714/45 |
| 2015/0082313 | A1 | * | 3/2015 | Aharonov | ............... G06F 11/36 718/102 |

* cited by examiner

*Primary Examiner* — Mischita L Henson
(74) *Attorney, Agent, or Firm* — JCIPRNET

(57) ABSTRACT

An electronic device and a method for event logging are provided. The electronic device includes a random access memory (RAM), a non-volatile memory, a transient error detector, and a clock counter. When a status of input-output ports in the electronic device changes, the transient error detector takes the status of the input-output port and its change as one of the event logs, obtains a time stamp corresponding to the one of the event logs according to a count value counted by the clock counter, and sequentially and temporarily stores the one of the event logs and a corresponding time stamp to the RAM. And, the transient error detector determines whether the event log is a cause to fault. When the event log is the cause to fault, the transient error detector stores the event logs and the corresponding time stamps in the RAM to the non-volatile memory.

8 Claims, 2 Drawing Sheets

ELECTRONIC DEVICE AND METHOD FOR EVENT LOGGING

CROSS-REFERENCE TO RELATED APPLICATION

This application claims the priority benefit of Taiwan application serial no. 107112936, filed on Apr. 16, 2018. The entirety of the above-mentioned patent application is hereby incorporated by reference herein and made a part of this specification.

BACKGROUND OF THE INVENTION

Field of the Invention

The invention relates to a status recording technique of an electronic device, and particularly relates to an electronic device and a method for event logging.

Description of Related Art

People have higher requirements on stability of a server system, and hope that the server system may record abnormal events in detail in case that an abnormal status occurs, so as to facilitate a maintenance staff performing debugging. In the existing server system, a table look-up technique and a Real-Time Clock (RTC) are adopted to record an event log and take an occurrence moment of the event log as a time stamp to facilitate the maintenance staff to know the reason that causes fault of the server system during debugging. However, the RTC takes "second" as a counting unit, and event logs occurred in a same second may have the same time stamp, so that it is unable to learn an occurrence sequence of these event logs in one second. As an operating frequency of the server system becomes higher, a manager or the maintenance staff is hard to correctly find the reason of the malfunction from these event logs.

Another debugging method is to use an oscilloscope to measure corresponding circuit signals in the server system. Although the oscilloscope may detect a signal variation of a nanosecond ($10^{-9}$ second) level, a large storage space is required in order to store or read these signals, and the maintenance staff has to spend a lot of manpower and time in dismantling a casing of the server system and erecting the oscilloscope.

Therefore, if an occurrence moment of the event log may be more accurately known, i.e. to increase a time resolution used for recording the occurrence moment of the event log, the maintenance staff is easier to perform debugging.

SUMMARY OF THE INVENTION

The invention is directed to an electronic device and a method for event logging, which adopt a high frequency clock signal to produce an accurate and high-resolution time stamp, such that recorded event logs and the corresponding time stamps are adapted to help a maintenance staff to clearly determine an occurrence sequence of events.

The invention provides an electronic device for event logging. The electronic device includes a random access memory, a non-volatile memory, a transient error detector, and a clock counter. The random access memory is configured to temporarily store a plurality of event logs and a plurality of time stamps corresponding to the event logs. The transient error detector is coupled to the random access memory, the non-volatile memory and a plurality of input-output ports in the electronic device. The clock counter is coupled to the transient error detector. The clock counter generates a count value according to a clock signal. When a status of the input-output ports changes, the transient error detector takes the status of the input-output ports and the change thereof as one of the event logs, obtains the time stamp corresponding to the one of the event logs according to the count value, and sequentially and temporarily stores the one of the event logs and the corresponding time stamp to the random access memory. The transient error detector determines whether the event log is a cause to fault. When the event log is the cause to fault, the transient error detector stores the event logs and the corresponding time stamps in the random access memory to the non-volatile memory.

The invention provides a method for event logging in an electronic device. The electronic device includes a plurality of input-output ports, a random access memory and a non-volatile memory. The method includes: obtaining a count value generated by a clock counter according to a clock signal; determining whether a status of the input-output ports changes; taking the status of the input-output ports and the change thereof as one of event logs when the status of the input-output ports changes, obtaining a time stamp corresponding to the one of the event logs according to the count value, and sequentially and temporarily storing the one of the event logs and the corresponding time stamp to the random access memory; determining whether the event log is a cause to fault; and when the event log is the cause to fault, storing the event logs and the corresponding time stamps in the random access memory to the non-volatile memory.

Based on the above description, by adopting a high frequency clock signal, the clock counter is adapted to calculate the count value after the decimal point within each second, and when the status of the input-output ports of the electronic device changes, besides that the transient error detector takes the statuses and the corresponding changes as the event logs, the transient error detector further takes the count values as the time stamps of the event logs, so as to sequentially record the changes to the random access memory in detail. If the aforementioned event log is determined to be an event (which is referred to as a fault event) that causes fault by the transient error detector, the event logs and the corresponding time stamps recorded in the random access memory are further stored to the non-volatile memory (for example, a flash memory). In this way, a maintenance staff may read the event log that probably causes fault, and further read changed data of the input-output ports occurred within a predetermined time before and after an occurrence moment of the event log that causes fault. In this way, the maintenance staff may learn the event log in the electronic device that probably causes fault and further read the change of other input-output ports occurred before and after the occurrence moment of the event log through remote instructions, so as to improve accuracy of the time stamps, help debugging and take the data as a reference for ameliorating the electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings

DESCRIPTION OF EMBODIMENTS

Figure 1:
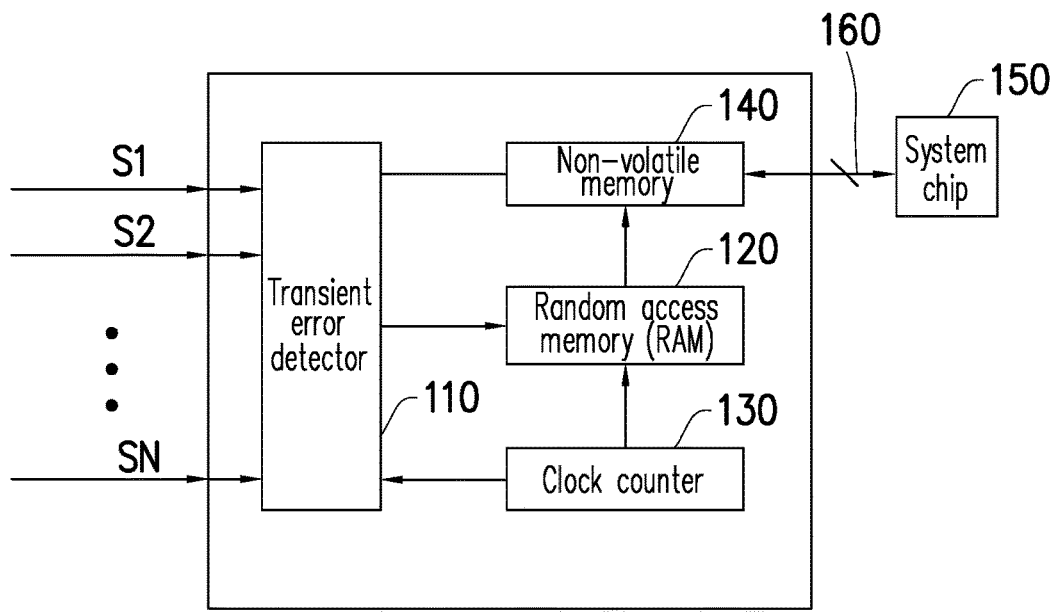
FIG. 1 is a block diagram of an electronic device according to an embodiment of the invention.

FIG. 1 is a block diagram of an electronic device 100 according to an embodiment of the invention. The electronic device 100 of the present embodiment may be a computer, a server, a notebook, a smart phone, etc.

The electronic device 100 mainly includes a transient error detector 110, a Random Access Memory (RAM) 120, a clock counter 130 and a non-volatile memory 140. The transient error detector 110 is coupled to the RAM, the non-volatile memory 140 and a plurality of input-output ports in the electronic device 100. In the embodiment, a plurality of input signals S1-SN are adopted to represent that the transient error detector 110 is connected to the plurality of input-output ports, where N is a positive integer. In detail, each of the input-output ports in the electronic device 100 may have one or a plurality of contacts, and each contact is adapted to produce a corresponding signal and is coupled to the transient error detector 110. The transient error detector 110 may be a controller such as an Application Specified Integrated Circuit (ASIC), a microprocessor . . . , etc. Detailed operations of the transient error detector 110 and the clock counter 130 are described with reference of a following embodiment.

The RAM 120 allows reading and writing operations performed at higher frequencies. The RAM 120 may also be referred to as a volatile memory. The non-volatile memory 140 may store data, and may still maintain integrity of the data after the electronic device 100 is turned off. The non-volatile memory 140 of the embodiment may be implemented by a flash memory. The RAM 120 of the embodiment and the non-volatile memory 140 are mainly used for storing event logs of the electronic device 100 and corresponding time stamps thereof. The so-called "time stamp" indicates to an occurrence moment of the corresponding event log, such that a maintenance staff may use the time stamps to learn an occurrence sequence of the adjacent event logs.

The RAM 120 of the embodiment may sequentially and temporarily store a plurality of event logs and the time stamps corresponding to the event logs. In other words, when the RAM 120 records too many event logs, the RAM 120 may process the event logs in a first in first out (FIFO) manner. Namely, when a large amount of event logs required to be recorded by the RAM 120 is produced, the RAM 120 may replace the event log earlier stored to the RAM 120 by the latest event log, so as to temporarily store the latest event logs.

In the embodiment, not every "event log" is confirmed by the transient error detector 110 to be a cause to fault, and the event log is produced as long as a status change of the input signals S1-SN exceeds a predetermined threshold, so as to integrally present detailed status changes of the input-output ports before and after occurrence of the event log determined to be the cause to fault. For example, when a standard value of one of the input signals is 5V, though an actually measured value of the input signal is drastically dropped by more than 5% of the standard value (5V) (namely, the value of the input signal is drastically dropped to be lower than 4.75V), the transient error detector 110 may take the status change as the event log required to be temporarily stored to the RAM 120, though the above status change is still within an allowable normal operation range of the electronic device 100. Comparatively, when actually measured value of the input signal is drastically dropped by more than 10% of the standard value (5V) (namely, the value of the input signal is drastically dropped to be lower than 4.5V), since the above situation probably causes fault of the electronic device 100, the transient error detector 110 may take the status change as a fault event, and take the status change as the event log that causes the fault for storing to the RAM 120, and further store the entire event logs and the corresponding time stamps in the RAM 120 to the non-volatile memory 140 for the maintenance staff to check and assist in debugging.

The electronic device 100 further includes a system chip 150. The system chip 150 is coupled to the non-volatile memory 140 through a bus 160. The maintenance staff may use remote instructions to control the system chip 150 to read the event logs and the corresponding time stamps in the non-volatile memory 140. The system chip 150 may be a chipset, a Baseboard Management Controller (BMC), a central processor, a platform management controller, etc. The bus 160 of the embodiment may be an $I^2C$ bus or a Serial Peripheral Interface (SPI).

Figure 2:
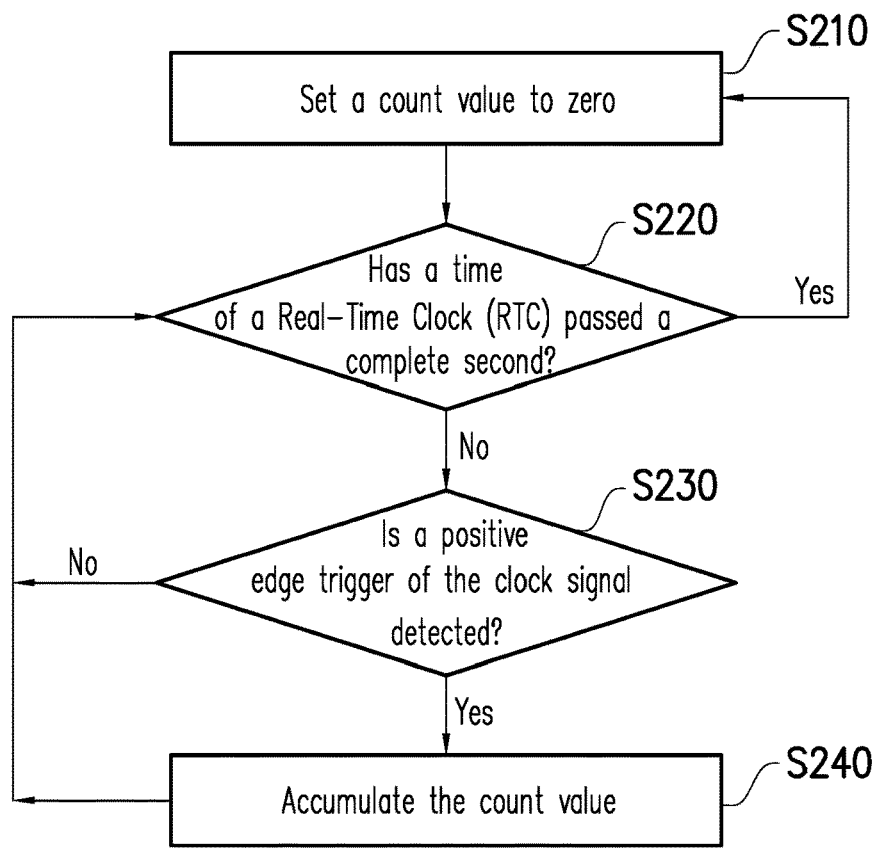
FIG. 2 is a flowchart of a clock counter according to an embodiment of the invention.

An operation flow of the clock counter 130 is described in detail below. FIG. 2 is a flowchart of the clock counter 130 according to an embodiment of the invention. Referring to FIG. 1 and FIG. 2, in step S210 of FIG. 2, the clock counter 130 may set a counter therein to zero at the beginning of every second. Then, in step S220, the clock counter 130 determines whether a time of a Real-Time Clock (RTC) has passed a complete second. When the time of the RTC has not passed a complete second, a step S230 is executed after the step S220, by which the clock counter 130 receives a high frequency clock signal, and determines whether a positive edge trigger of the clock signal is detected within each second. In the embodiment, the so-called "high frequency clock signal" may be a clock signal of 100 MHz or 1 GHz. Namely, the frequency of the clock signal is 100 MHz (a cycle of the clock signal is 10 ns) or 1 GHz (the cycle of the clock signal is 1 ns). When the positive edge trigger of the clock signal is detected, a step S240 is executed after the step S230, by which the clock counter 130 accumulates a count value in the clock counter 130. After execution of the step S240 is completed, the flow returns to the step S220, and the clock counter 130 again determines whether a complete second has passed, so as to execute the steps S210-S240. In the step S220, when the clock counter 130 determines that the completed second has passed, the flow returns to the step S210 to set the count value to zero at a next second, and the steps S220-S240 are executed to re-accumulate the count value according to the clock signal.

In this way, the count value of the clock counter may be used for representing high resolution time information within each second. For example, when the time of the RTC enters 10:00:52 from 10:00:51, and now when the transient error detector 110 determines that it is necessary to temporarily store a certain event log to the RAM 120, if the present count value is 9, the high resolution information of this moment is "10:00:52.000000090". Therefore, the transient error detector 110 may use the RTC in the electronic device 100 and the count value provided by the clock counter 130 to obtain the high resolution information of this moment, and use the high resolution information as a time stamp of the event log.

Figure 3:
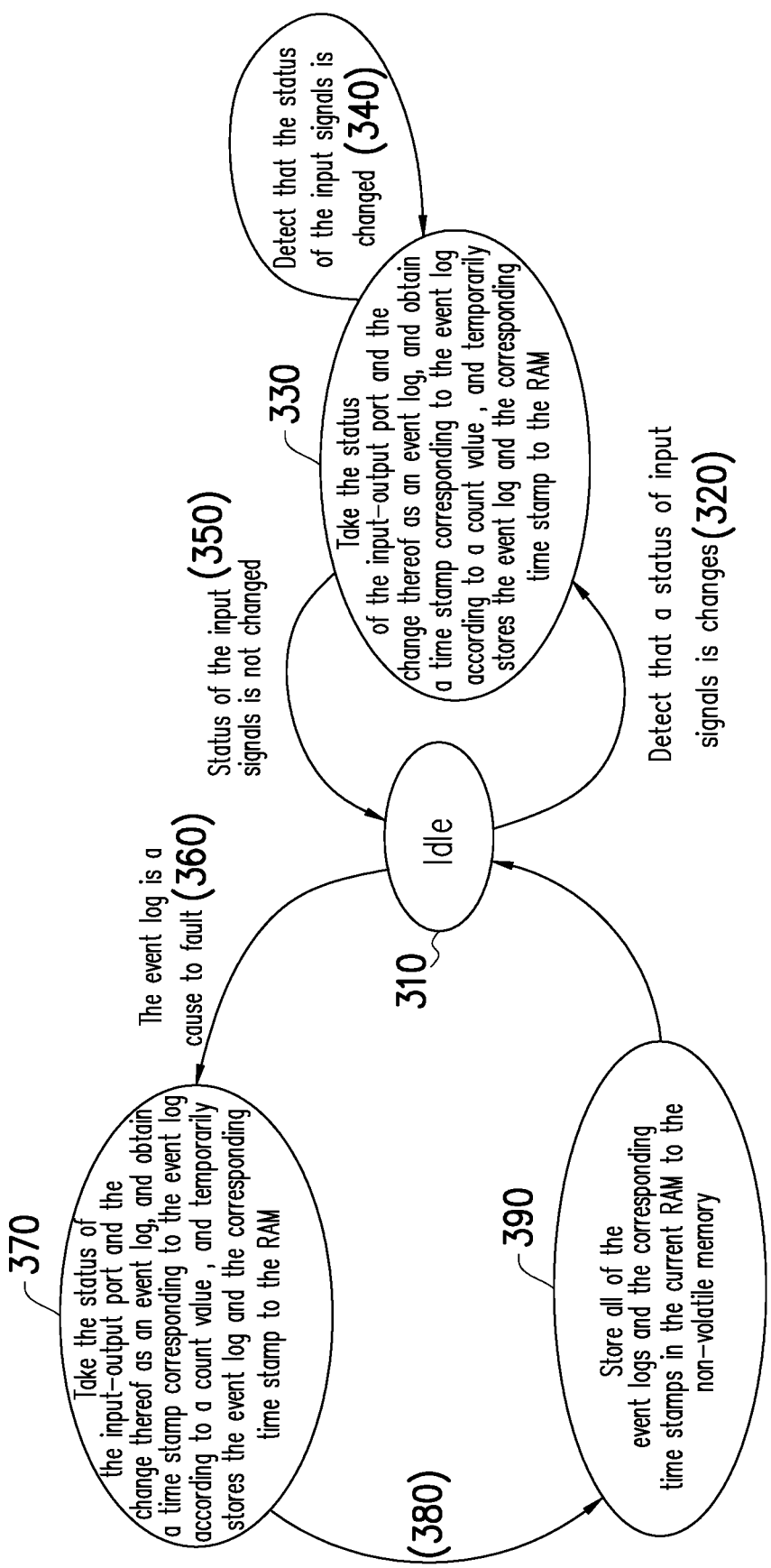
FIG. 3 is a flowchart illustrating a method for implementing event recording by a transient error detector according to an embodiment of the invention.

An operation flow of the transient error detector 110 is described in detail below. FIG. 3 is a flowchart illustrating a method for implementing event recording by the transient error detector 110 according to an embodiment of the invention. Referring to FIG. 1 and FIG. 3, when the transient error detector 110 detects that a status the input-output ports (i.e. the input signals S1-SN) is not changed, the transient error detector 110 is in an idle state 310. When the transient error detector 110 detects that the status of the input-output ports (i.e. the input signals S1-SN) is changed (step S320), the transient error detector 110 is changed from the state 310 to a state 330, and the transient error detector 110 takes the status of the input-output port and the change thereof as one of the event logs, and obtains a time stamp corresponding to the one of the event logs according to a count value counted by the clock counter 130, and sequentially and temporarily stores the event log and the corresponding time stamp to the RAM 120. If the transient error detector 110 still detects that the status of the input-output port changes in the state 330 (step S340), the transient error detector 110 continually execute the operations of the state 330. When the transient error detector 110 is in the state 330, and does not detect the status change of the input-output port (step S350), the flow returns to the step S310 from the state 330 to continue the idle.

When the transient error detector 110 detects that the status of the input-output port changes and determines that the event log corresponding to the status and the change thereof may cause fault (step S360), the transient error detector 110 enters a state 370 from the state 310, and the transient error detector 110 takes the status of the input-output port and the change thereof as one of the event logs, and obtains a time stamp corresponding to the one of the event logs according to the count value provided by the clock counter 130, and sequentially and temporarily stores the event log and the corresponding time stamp to the RAM 120. Then, through a step S380, the transient error detector 110 enters a state 390 from the state 370, and the transient error detector 110 stores all of the event logs (including the event log determined to be the cause to fault) and the corresponding time stamps in the current RAM 120 to the non-volatile memory 140. Now, the RAM 120 contains the event log determined to be the cause to fault and other event logs occurred at time close to the occurrence time of the event log determined to be the cause to fault, so that after the state 390, the event logs stored to the non-volatile memory 140 include the event log determined to be the cause to fault and other event logs occurred within a predetermined time (for example, within one second before and after the occurrence moment of the event log determined to be the cause to fault) before and after the occurrence moment of the event log determined to be the cause to fault. In some embodiments, in order to capture the event log occurred within one second after the occurrence moment of the event log determined to be the cause to fault, the transient error detector 110 continually stores the event logs to the RAM 120 within the one second after the state 370, and after the one second, the transient error detector 110 enters the state 390 from the state 370 to write all information in the RAM 120 to the non-volatile memory 140.

In summary, in the embodiment of invention, by adopting a high frequency clock signal, the clock counter is adapted to calculate the count value after the decimal point within each second, and when the status of the input-output ports of the electronic device changes, besides that the transient error detector takes the statuses and the corresponding changes as the event logs, the transient error detector further takes the count values as the time stamps of the event logs, so as to sequentially record the changes to the random access memory in detail. If the aforementioned event log is determined to be an event (which is referred to as a fault event) that causes fault by the transient error detector, the event logs and the corresponding time stamps recorded in the random access memory are further stored to the non-volatile memory (for example, a flash memory). In this way, a maintenance staff may read the event log that probably causes fault, and further read changed data of the input-output ports occurred within a predetermined time before and after an occurrence moment of the event log that causes fault. In this way, the maintenance staff may learn the event log in the electronic device that probably causes fault and further read the change of other input-output ports occurred before and after the occurrence moment of the event log through remote instructions, so as to improve accuracy of the time stamps, help debugging and take the data as a reference for ameliorating the electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device for event logging, comprising:
    a random access memory, configured to temporarily store a plurality of event logs and time stamps corresponding to the event logs;
    a non-volatile memory;
    a transient error detector, coupled to the random access memory, the non-volatile memory and a plurality of input-output ports in the electronic device; and
    a clock counter, coupled to the transient error detector, and configured to generate a count value according to a clock signal,
    wherein when a status of the input-output ports changes, the transient error detector takes the status of the input-output ports and the change thereof as one of the event logs, obtains the time stamp corresponding to the one of the event logs according to the count value, and sequentially and temporarily stores the one of the event logs and the corresponding time stamp to the random access memory,
    the transient error detector determines whether the event log is a cause to fault, and when the event log is the cause to fault, the transient error detector stores the event logs and the corresponding time stamps in the random access memory to the non-volatile memory,
    the clock counter accumulates the count value according to the clock signal within each second, and sets the count value to zero in a next second and re-accumulates the count value according to the clock signal.

2. The electronic device for event logging as claimed in claim 1, further comprising:
    a system chip, coupled to the non-volatile memory through a bus, and configured to read the event logs and the corresponding time stamps in the non-volatile memory,
    wherein the bus is an I2C bus or a Serial Peripheral interface (SPI).

3. The electronic device for event logging as claimed in claim 1, the non-volatile memory is a flash memory,
wherein when the event log is the cause to fault, the event logs stored in the non-volatile memory comprise the event log determined to be the cause to fault and the event logs occurred within a predetermined time before and after an occurrence moment of the event log determined to be the cause to fault.

4. The electronic device for event logging as claimed in claim 1, a frequency of the clock signal is 100 MHz or 1 GHz.

5. A method for event logging in an electronic device, the electronic device comprising a plurality of input-output ports, a random access memory and a non-volatile memory, and the method for event logging comprising:
obtaining a count value generated by a clock counter according to a clock signal;
determining, by a transient error or detector, whether a status of the input-output ports changes;
taking, by the transient error detector, the status of the input-output ports and the change thereof as one of event logs when the status of the input-output ports changes, obtaining, by the transient error detector, a time stamp corresponding to the one of the event logs according to the count value, and sequentially and temporarily storing, by the transient error detector, the one of the event logs and the corresponding time stamp to the random access memory;
determining, by the transient error detector, whether the event log is a cause to fault; and
when the event log is the cause to fault, storing the event logs and the corresponding time stamps in the random access memory to the non-volatile memory by the transient error detector,
wherein accumulating, by a clock counter, the count value according to the clock signal within each second and setting the count value to zero in a next second and re-accumulates the count value according to the clock signal.

6. The method for event logging as claimed in claim 5, further comprising: using a system chip to read the event logs and the corresponding time stamps in the non-volatile memory.

7. The method for event logging as claimed in claim 5, wherein when the event log is the cause to fault, the event logs stored in the non-volatile memory comprise the event log determined to be the cause to fault and the event logs occurred within a predetermined time before and after an occurrence moment of the event log determined to be the cause to fault.

8. The method for event logging as claimed in claim 5, a frequency of the clock signal is 100 MHz or 1 GHz.

* * * * *